UNITED STATES PATENT OFFICE.

CHARLES A. PHIPPS AND CHARLES C. QUINN, OF EVANSTON, WYOMING TERRITORY.

IMPROVEMENT IN TRACK-CLEARERS.

Specification forming part of Letters Patent No. 175,156, dated March 21, 1876; application filed January 31, 1876.

*To all whom it may concern:*

Be it known that we, CHARLES A. PHIPPS and CHARLES C. QUINN, of Evanston, in the county of Uinta and Territory of Wyoming, have invented certain new and useful Improvements in Railroad-Track Snow and Ice Cleaner; and we do hereby declare that the following is a full, clear, and exact description thereof, which will enable others skilled in the art to which it pertains to make and use the same, reference being had to the accompanying drawing, and to the letters of reference marked thereon, which form a part of this specification.

Figure 1:
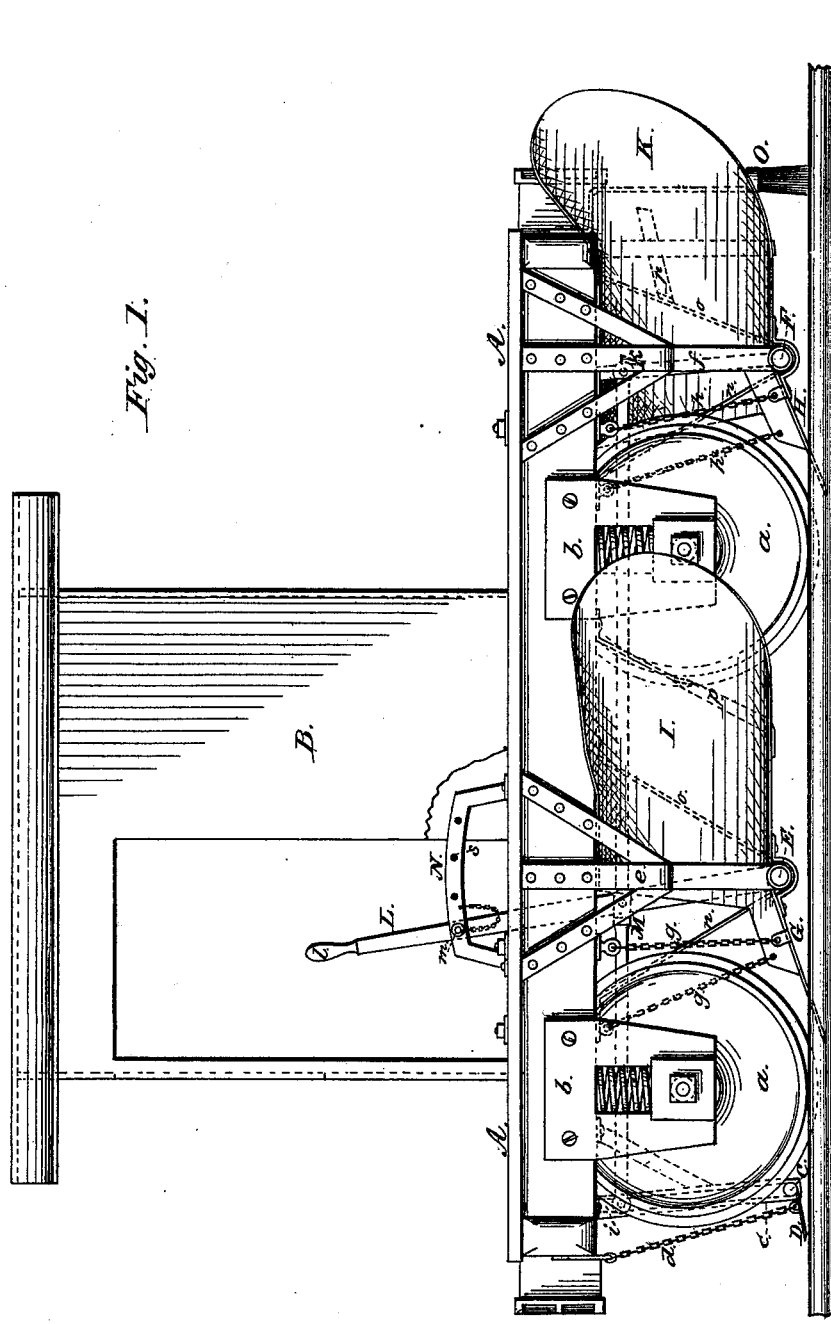
Figure 2:
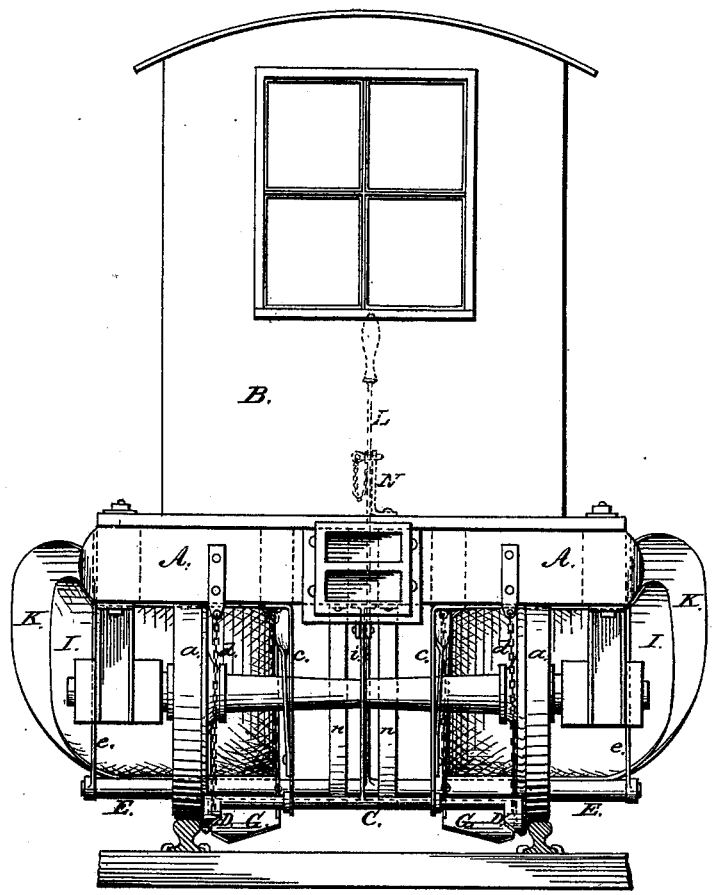

Figure 1 represents a side elevation of our railroad-track snow and ice cleaner. Fig. 2 represents a front elevation of the same.

The object of our invention is to provide a snow and ice cleaning machine for railroad-tracks, &c., by which not only the snow and ice on the face of the railroad-tracks, but also that between the tracks, and which becomes packed in or frozen, can be readily removed and thrown to the sides of the railroad-tracks. The shovels and cutters are also adjustable, so as to be readily adjusted to any height, or lifted over any obstructions of extraordinary kind.

The invention consists of a truck to be connected to the front of the locomotive, and is provided with a suitable cab or house for the operators. To the lower side of the truck are journaled transverse shafts by suitable brackets and bearings, and are provided with steel or iron shovels or scrapers, and held suspended near their outer ends by chains. The shafts are provided with upright levers or arms, and connected near their upper ends to a longitudinal bar or rod, and operated by a lever that passes through the floor of the cab, said lever being provided with a handle, and held in position by a pin passing through a quadrant or sector secured to the floor of the cab. To the rear end of the truck are attached suitable brooms, to finish the cleaning of the track.

In the accompanying drawing like letters refer to like parts in the figures.

In the drawing, A represents a suitable truck, provided with the usual wheels $a\ a$ and pedestals $b\ b$, and a cab or house, B. To the front end of the truck, and as close as possible to the track, in front of the front wheels $a\ a$, is journaled a shaft, C, in brackets $c\ c$, secured to the bottom side of the truck. This shaft C is provided with narrow shovels or cutters D, held suspended at their outer ends by chains $d$, and arranged as close as possible to the flanges of the wheels, so as to break and clear the ice and snow in front of the wheels. As close as possible to, and immediately behind, the wheels $a\ a$ are arranged the transverse shafts E F, in brackets $e\ f$, that are secured to the sides of the frame of the truck. To the shafts E F are firmly secured or attached pairs of shovels or scrapers G H, broader than the first pair, D, and suspended in such manner by chains $g\ h$ as to come as near as possible to the inner side of the track. These shovels G H connect with and are formed into plows or mold-boards I K, with curved ends on their outer sides, so as to guide and convey the ice and snow loosened by the shovels clear off the track. The latter one, K, is curved a little more than the front one, so as to throw all the ice and snow entirely clear of the following train. The outer shafts C and F are provided with upward-turned levers $i\ k$, and the central shaft, E, with a longer lever, L, which passes up through the floor of the cab B, and terminates in a handle, $l$. All the levers are connected to a horizontal longitudinal bar or rod, M, and manipulated by the lever L from the cab, so as to raise them, in case of obstructions of any unusual kind, or to adjust them to the desired position. A suitable quadrant or sector, N, is secured to the floor of the cab B, and the lever L is held in the desired position by a pin, $m$, attached to a small chain, and fitting the holes $s$ in the quadrant. To the rear end of the truck A are secured the two brooms O, by which the track is finally swept and cleared of the smallest particles of ice and snow. The rear sides of all the plows are rigidly secured to the bottom of the truck by braces or brackets $n\ o\ p$, so as to have no possible yield, and that they may guide and clear the track of all ice and snow.

The different parts of our snow and ice clearing machine may be made of any suitable materials and sizes to suit different railroads and necessities.

The operation is as follows: The truck is connected to the front of the locomotive, the shovels and shafts adjusted to the proper position to suit the bed of the track, and the lever L secured by the pin m, and the engine is started. The front shovels D then break and loosen the ice on the track in front of the front wheels a, the shovels G and H break and loosen the ice and snow between the track, and guide it into the plows I and K, which throw it entirely clear of the track by their outer curved ends. Any small particles left are finally brushed off the track by the brooms O on the rear end of the truck.

The operators in the cab can, of course, raise and lower the shovels to any desired position, and can observe any unusual obstructions through the front window of the cab.

The advantages of our machine are, that the snow and ice are thoroughly cleared out from between the tracks, and it gives no opportunity to the snow and ice to become so hard and frozen, as is often the case in very cold climates, as to throw the cars off the track, and endanger the lives of passengers, &c.

The shovels, being adjustable, can be set to any desirable height, and very quickly and easily manipulated. The plows connected to the shovels, being curved in the outward direction from the track, throw the ice and snow entirely out of the way, especially when going at the rate of fifteen to twenty miles an hour.

Another great advantage is, that the labor of hundreds of men can be dispensed with, as with the snow-clearing machines now generally in use the snow and ice between the tracks cannot be reached, and must be removed by manual labor.

The whole apparatus is very simple, and not liable to get out of order, and it can be made at a very moderate cost.

Having thus described our invention, what we claim, and desire to secure by Letters Patent, is—

1. The adjustable shovels G H, in combination with plows I K, arranged and operated by levers L i, substantially as shown and specified.

2. The combination of a railroad-truck, A, shovels D G H, and plows I K with levers i k L and connecting-bar M, arranged and operating substantially as and for the purpose described.

In testimony that we claim the foregoing as our own we hereby affix our signatures in presence of two witnesses.

C. A. PHIPPS.
      C. C. QUINN.

Witnesses:
 E. S. BISBING,
 HENRY S. LEE.